(12) United States Patent
Wikel et al.

(10) Patent No.: US 10,052,993 B2
(45) Date of Patent: Aug. 21, 2018

(54) BELT DISCHARGE BODY

(71) Applicant: Pegasus Vans and Trailers, Inc., Sandusky, OH (US)

(72) Inventors: Dean Wikel, Berlin Heights, OH (US); Larry McGee, Berlin Heights, OH (US); Philip Schaeffer, Monroeville, OH (US); Shane Thomas, Vickery, OH (US); Kerk Ryan, Huron, OH (US)

(73) Assignee: PEGASUS VANS & TRAILERS, INC., Sandusky, OH (US)

( * ) Notice: Subject to any disclaimer, the term of this patent is extended or adjusted under 35 U.S.C. 154(b) by 78 days.

(21) Appl. No.: 15/359,601

(22) Filed: Nov. 22, 2016

(65) Prior Publication Data
US 2017/0144579 A1    May 25, 2017

Related U.S. Application Data

(60) Provisional application No. 62/259,978, filed on Nov. 25, 2015.

(51) Int. Cl.
*B60P 1/38* (2006.01)
*B62D 33/04* (2006.01)
(Continued)

(52) U.S. Cl.
CPC ........... *B60P 1/38* (2013.01); *B62D 21/18* (2013.01); *B62D 33/046* (2013.01); *B65G 67/24* (2013.01); *B65G 2201/04* (2013.01)

(58) Field of Classification Search
CPC ........... B60P 1/38; B62D 21/09; B62D 21/18; B62D 29/008; B62D 33/046; B62D 33/077
See application file for complete search history.

(56) References Cited

U.S. PATENT DOCUMENTS 2,855,213 A * 10/1958 Gerhardt ............... B62D 21/18
                                                                280/791
3,049,251 A *  8/1962 Glew ....................... B60P 1/38
                                                                414/528

(Continued)

FOREIGN PATENT DOCUMENTS

GB          2546420 A  *  7/2017 ................ B60P 3/20

OTHER PUBLICATIONS

"Horizontal Belt Discharge—Update", http://grahamlustytrailers.com.au/horizontal-belt-discharge-update/, Jun. 18, 2015, Queensland, Australia.

*Primary Examiner* — James Keenan
(74) *Attorney, Agent, or Firm* — Rankin, Hill & Clark LLP

(57) ABSTRACT

Aluminum belt-discharge bodies configured for installation on frames of straight truck or trailer chassis used in construction materials hauling. The use of aluminum provides substantial weight savings, which allows for an increase in the payload that can be hauled by the truck to the paving machine. The belt bodies also feature a wider unloading belt as compared to conventional steel live-bottom trucks, which increases efficiency, reduces unloading time and generates faster cycle times. The wider bottom lowers the center of gravity of the vehicle, resulting in more stability and safety. Furthermore, a wider body with sloped side walls reduces and/or eliminates the effects of transportation segregation of the asphalt or aggregate being hauled. Belt-discharge bodies according to the invention effectively remix the material being hauled as it is unloaded.

20 Claims, 8 Drawing Sheets

(51) Int. Cl.
*B62D 21/18* (2006.01)
*B65G 67/24* (2006.01)

(56) References Cited

U.S. PATENT DOCUMENTS

| | | | | |
|---|---|---|---|---|
| 3,708,938 | A * | 1/1973 | Tantlinger | B61D 17/041 |
| | | | | 105/401 |
| 3,857,502 | A * | 12/1974 | Holland | B60P 1/38 |
| | | | | 198/311 |
| 4,005,790 | A * | 2/1977 | Holland | B60P 1/38 |
| | | | | 222/328 |
| 4,055,265 | A * | 10/1977 | Eisenman | B60P 1/38 |
| | | | | 198/844.1 |
| 5,085,025 | A * | 2/1992 | Gaddis | B62D 21/18 |
| | | | | 280/107 |
| 5,102,285 | A * | 4/1992 | Gust | B60P 1/38 |
| | | | | 198/849 |
| 6,592,170 | B2 * | 7/2003 | McWilliams | B62D 33/046 |
| | | | | 296/184.1 |
| 7,152,909 | B2 * | 12/2006 | Booher | B21C 23/145 |
| | | | | 296/182.1 |
| 9,840,288 | B2 * | 12/2017 | Stojkovic | B62D 27/023 |
| 2006/0059791 | A1 * | 3/2006 | Conny | B62D 25/02 |
| | | | | 52/71 |

* cited by examiner

BELT DISCHARGE BODY

BACKGROUND OF INVENTION

Field of Invention

The present invention relates to bodies configured for installation on frames of straight truck or trailer chassis and, more particularly, to aluminum belt-discharge bodies configured for installation on frames of straight truck or trailer chassis used in the highway material hauling industry.

Brief Description of Related Art

Hot-mix asphalt should be delivered from an asphalt plant to a paving machine with minimal change in the characteristics of the asphalt mix during the delivery process. Generally speaking, there are three types of vehicles utilized in the United States for this purpose.

End-dump trucks deliver the asphalt mix from the truck bed into the hopper of a paving machine. Unloading is accomplished using the force of gravity. The front of the bed of the truck is raised, which allows the mix to slide down and out an opening in the back of the bed and into the hopper of the paving machine, which then paves the asphalt mix onto the roadway surface. Trucks of this type present certain problems, particularly when the truck bed is in a raised condition. Trucks with large beds can sometimes strike overhead power lines or bridges when the bed is raised.

A second type of vehicle used to deliver hot-mix asphalt is known as a bottom-dump or belly-dump truck. This type of vehicle delivers its load to the roadway surface ahead of the paving machine. An ancillary material pickup machine is mounted to the front of the paving machine, and picks up and delivers the hot mix asphalt from the roadway surface to the hopper of the paving machine. This type of delivery vehicle requires secondary equipment (e.g., the material pickup machine) and also undesirably requires the hot mix asphalt to be dropped to the roadway surface, then picked up again, before being laid down by the paving machine. This can result in a degradation of the hot mix asphalt, for example by adversely allowing the mix to cool before it is laid down by the paving machine.

The third type of vehicle used to deliver hot mix asphalt to paving machines is known as a live-bottom truck, a horizontal-discharge truck, or a belt-discharge truck (hereinafter referred to as "live-bottom truck"). This type of vehicle utilizes a truck bed having a bottom, four walls extending up from the bottom in which the back wall is a gate that selectively opens and closes, and an open top. The two side walls and the front wall are sloped away from each other as they extend up from the bottom (i.e. are angled inward going toward the bottom, referred to herein as being "sloped") so that the payload is directed by gravity and the sloped walls to a conveyor/discharge belt mounted in the bottom of the truck bed. As the discharge belt is operated, the hot mix asphalt is discharged past the open gate and into the hopper of the paving machine without the need to raise the truck bed and without the need for secondary material pickup machines. Vehicles of this type can deliver hot-mix asphalt to paving machines in large quantities. But there is room for improvement in such vehicles.

BRIEF SUMMARY OF THE INVENTION

The present invention provides truck beds (also referred to herein as "bodies") configured for installation on frames of straight truck or trailer chassis. More particularly, the present invention provides aluminum belt-discharge bodies configured for installation on frames of straight truck or trailer chassis, which can be used in the highway material hauling industry.

Various terms of direction are used herein for convenience, and are made with reference to a vehicle containing occupants that are forward-facing. As such, the term "front" refers to the side of the vehicle or a direction in which the occupants are facing. The term "back" and "rear" refers to the side of the vehicle or a direction away from which the occupants are facing. The term "left" refers to a side of the vehicle or a direction to the left of such occupants, i.e. the driver's side of the vehicle in the United States. The term "right" refers to the side of the vehicle or a direction to the right of such occupants. The term "top" refers to the side of the vehicle or a direction above the occupants. The term "bottom" refers to the side of the vehicle or a direction below the occupants. The term "longitudinal" or cognate terms, refer to a direction or element that is extending between the front and back of the vehicle. The term "cross", "lateral", or "transverse" refer to a direction or element perpendicular to the longitudinal direction, and extending between the right and left sides of the vehicle.

In one embodiment, the present subject matter includes a belt-discharge body configured to be mounted to a frame of a straight truck or trailer chassis, and comprising an open-top reservoir defined by a base and a plurality of walls extending up from the base, and an aluminum subframe attached to a bottom of the base. The walls include a sloped front wall, a back wall, a sloped right side wall, and a sloped left side wall. The base includes two one-piece aluminum longitudinal frame members, each including a main vertical wall and three shelves extending horizontally from an inside surface of the main vertical wall. The three shelves include a bottom shelf, a top shelf, and a middle shelf located between the bottom shelf and the top shelf. The top shelf includes a groove. A portion of each of the side walls is fitted inside the groove of one of the frame members to thereby align the side walls with respect to the base. The base includes a plurality of aluminum cross members, each supported on the middle shelves of the frame members, and extending laterally between the frame members and securing the frame member relative to each other. The base includes a plurality of aluminum supports located between the frame members and extending longitudinally between, and secured to the cross members. The belt discharge body also includes a belt conveyor system mounted between the frame members and including a continuous belt. The back wall defines a gate configured to open so that associated material contained inside the reservoir can be discharged through the gate by the belt conveyor system.

In another embodiment, the present subject matter includes a live-bottom truck comprising a truck frame, wheels attached to the truck frame, and a belt discharge body mounted on top of the truck frame. The truck frame includes two steel beams extending longitudinally between a front and a back of the truck. The truck frame having a width defined by the distance between outside surfaces of the beams. The belt discharge body includes an open-top reservoir and an aluminum subframe positioned between the open-top reservoir and the truck frame. The open-top reservoir includes a base and four walls extending up from the base. The walls comprise a sloped front wall, a sloped right side wall, a sloped left side wall, and a back gate. The base includes a one-piece aluminum right longitudinal frame member and a one-piece aluminum left longitudinal frame member. Each of the frame members include a main vertical wall and three shelves extending horizontally from an inside surface of the main vertical wall. The shelves include a bottom shelf, a top shelf including a groove, and a middle shelf located between the bottom shelf and the top shelf. The base includes a plurality of aluminum cross members each supported at either end on the middle shelf of the respective right and left frame members, and each extending laterally between the frame members and securing the frame members relative to each other. The base includes at least three aluminum supports, and up to four, five, or even ten supports, located between the frame members and extending longitudinally between, and secured to the cross members. The base also includes a belt conveyor system mounted between the frame members and including a continuous belt and two continuous chains. The subframe includes two longitudinal rails and a plurality of lateral members extending between the rails and securing the rails relative to each other. A width of the base, which is defined by the distance between the outside edges of the frame members, is greater than a width of the truck frame. The lateral members of the subframe rest upon the beams of the truck frame.

The foregoing and other features of the invention are hereinafter more fully described below, the following description setting forth in detail certain illustrative embodiments of the invention, these being indicative, however, of but a few of the various ways in which the principles of the present invention may be employed.

BRIEF DESCRIPTION OF THE DRAWINGS

With reference to the accompanying drawing figures, please note that.

DETAILED DESCRIPTION OF THE INVENTION

Figure 1:
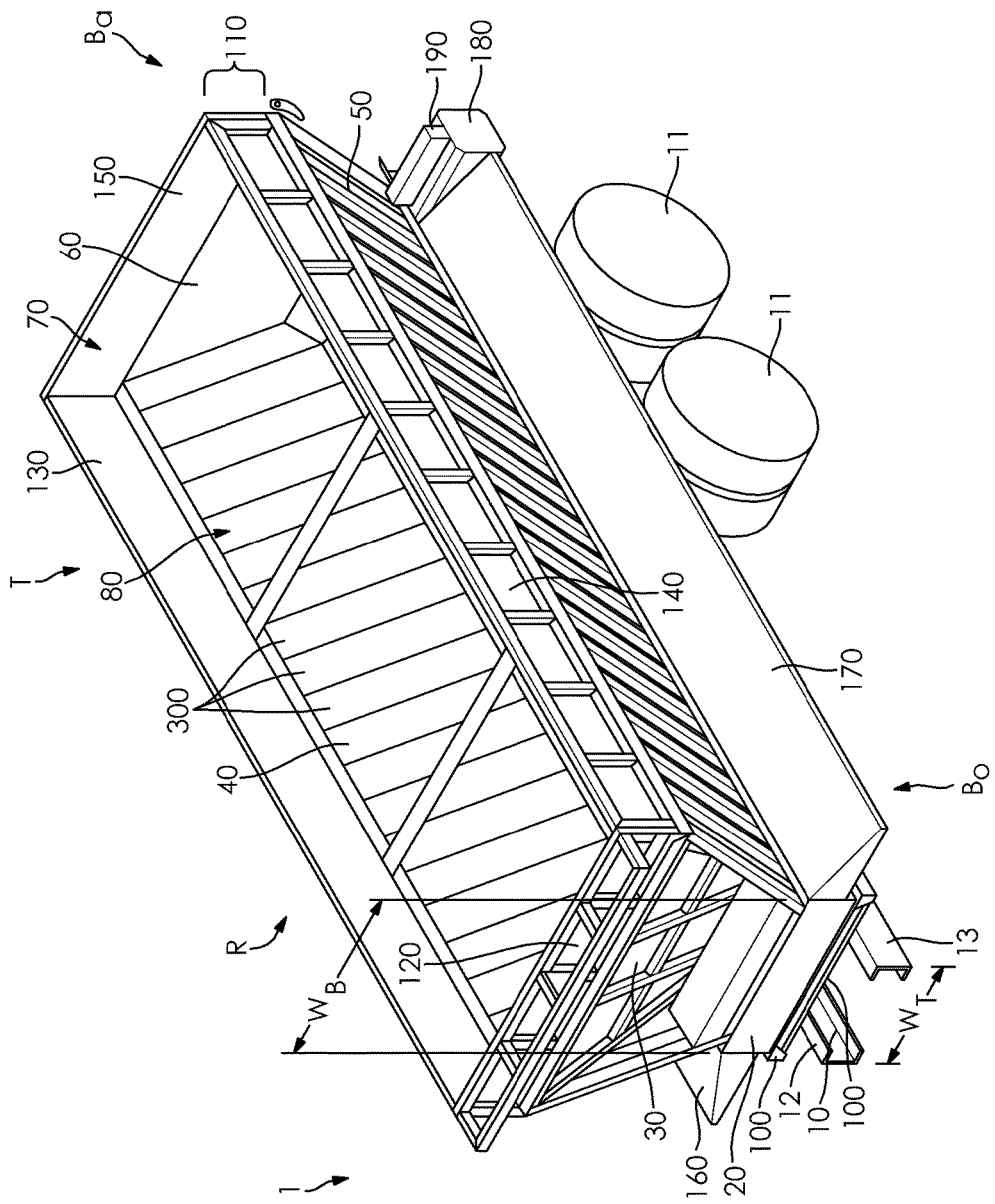
FIG. 1 is a perspective view taken from above and in front of a left side of a belt-discharge body according to an embodiment of the invention.

The aluminum belt-discharge bodies of the invention are configured for installation on frames of straight truck or trailer chassis, and are designed for hauling hot-mix asphalt and other highway construction materials. In contrast, conventional live-bottom trucks have been constructed principally of steel material. Steel is strong, which is advantageous because the hot mix asphalt material is frequently dropped into the live-bottom truck from a height above the walls of the truck bed. Strength is also advantageous when the truck is used for purposes other than hauling hot mix asphalt (e.g., hauling aggregates used in road construction). But steel is also quite heavy. Vehicles used to haul hot-mix asphalt and other highway construction materials are subject to weight restrictions in order to utilize public highways. Thus, the weight of the steel reduces the amount of material that can be hauled in the truck.

The weight of the present aluminum belt-discharge bodies is significantly reduce over conventional steel belt-discharge bodies of similar size due to the use of aluminum for constructing the bodies. Such reduction in weight of the aluminum bodies allows for carrying a larger payload without exceeding road weight limits. Thus, there is an increase in the amount of payload that can be hauled to a paving machine by trucks that include the aluminum belt-discharge bodies. This increase in payload capacity translates to fewer trips between the asphalt plant and the paving machine, which saves fuel and reduces the cost of roadway construction.

To take advantage of the allowable increase in the weight of the payload, the aluminum belt-discharge bodies are designed to have a wider bottom, thereby increasing the payload capacity compared to conventional steel belt-discharge bodies with narrower bottoms.

However, the use of aluminum presents a number of obstacles, including the reduced strength of aluminum parts as compared to comparably sized steel parts. That is, aluminum simply cannot be substituted for steel, as the two materials have completely different material properties. For example, while aluminum is lighter than steel, it has less strength than steel. This decreased strength of aluminum is a concern for the side walls of the belt-discharge body, especially with respect to loading conditions, wherein road construction materials typically have an average weight of 4000 lbs. per cubic yard. These materials are conventionally dropped from overhead silos or loader buckets from a height of approximately fifteen feet or more above ground level, resulting in significant stress to the body during loading, especially to the side walls and structure supporting the discharge belt. Therefore, in several embodiments, the aluminum belt-discharge bodies of the present invention are configured to withstand such rigors by being constructed from extruded aluminum parts. The extrusion of the various parts provides increased strength compared to similarly sized parts formed from, for example, aluminum sheets.

Another problem arising from conventional vehicles is that the hot asphalt or aggregate mix experiences segregation during transport, wherein larger particles in the mix tend to move outward towards the periphery of the mass of the mix and/or segregate from the remainder of the mix. This phenomenon is referred to herein as transportation segregation. Such transport segregation is a quality control issue, as most material specifications require a well-mixed product that is not significantly segregated.

The belt-discharge bodies of the present invention feature a wider bottom as compared to conventional live-bottom trucks and a corresponding wider discharge belt. As compared with conventional vehicles, including dump trucks and belt-discharge trucks that have narrower belts, the wider bottom and wider discharge belt is able to reverse, reduce and/or eliminate the effects of transportation segregation of the asphalt or aggregate being hauled. That is, belt-discharge bodies according to the invention effectively remix the material being hauled as it is unloaded by the conveyor belt. Further, the wider bottom increases payload capacity of the bodies, increases the speed at which the payload is unloaded, and thus generates faster cycling times for the truck between the asphalt plant and the paving machine. A wider bottom also lowers the center of gravity of the belt-discharge bodies, resulting in more stability and safety while driving a truck including such bodies.

An additional problem with the use of dump trucks arises because the asphalt can slide down the bed and out the back of the dump truck in an uncontrollable manner, thereby causing the paving machine to be pushed backward into fresh pavement and resulting in an undesirable non-flat paved surface. The belt-discharge bodies avoid this problem by having a controlled discharge of material based on the speed of rotation of the conveyor belt.

In constructing the aluminum belt-discharge bodies, several considerations had to be taken into account. For example, the frames of typical trucks and trailer chassis are generally made of steel. Therefore, when mounting the aluminum belt-discharge bodies to these steel chassis, there is potential for galvanic corrosion due to electrolysis between the aluminum bodies and the steel frame of the truck.

Furthermore, typical trucks and trailer chassis generally include a frame that has two longitudinally extending steel frame members that are space approximately 34 inches apart. To account for this 34 inch width of the truck chassis, conventional belt-discharge bodies have a bottom frame with a width of approximately 30 inches and a discharge belt of corresponding width. In this way, the conventional belt-discharge bodies can be easily mated and attached to the truck frame of similar width. However, since the instant aluminum belt-discharge bodies have a wider bottom, e.g. about 42 inches or more, conventional designs will not exactly match to the narrower truck frames. Accordingly, the connection between the wider aluminum belt-discharge bodies and narrower truck frames have to be addressed. Belt-discharge bodies according to the invention therefore include a subframe for accommodating this difference in width and bridging the difference in width between the narrower truck frame and the wider bottoms of the aluminum belt-discharge bodies.

Belt-discharge bodies according to the invention provide several distinct advantages when compared to conventional live-bottom trucks made of steel. In addition to the advantages previously noted above (e.g., lower weight, lower center of gravity, and faster unloading time), aluminum belt-discharge bodies according to the invention require no painting, thus saving manufacturing time and expense associated with maintenance costs, and aluminum is easier than steel to handle, fabricate, and construct. Furthermore, aluminum does not rust-out like steel, which extends the service life of the aluminum bodies.

Figure 2:
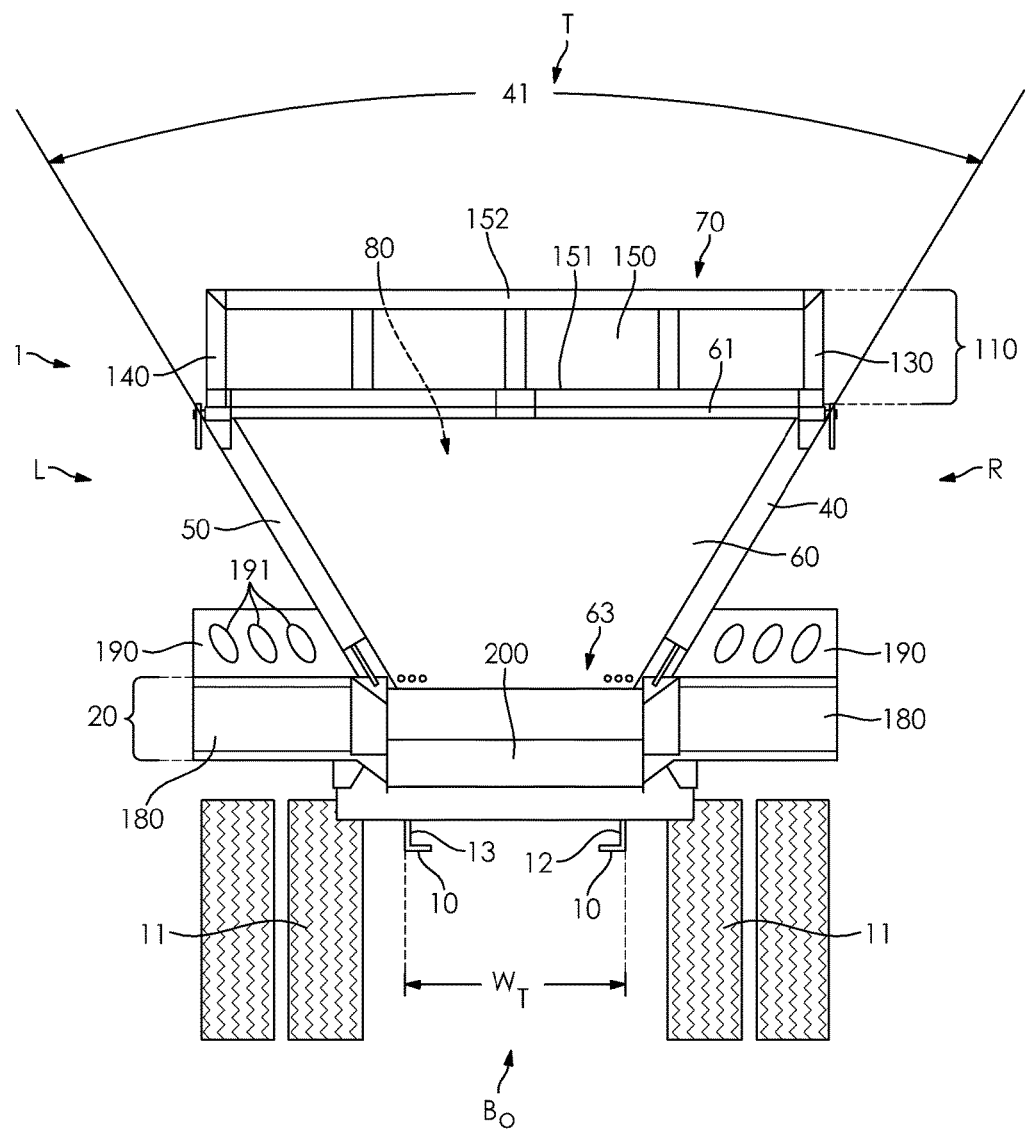
FIG. 2 is rear view of the belt-discharge body shown in FIG. 1.
Figure 3:
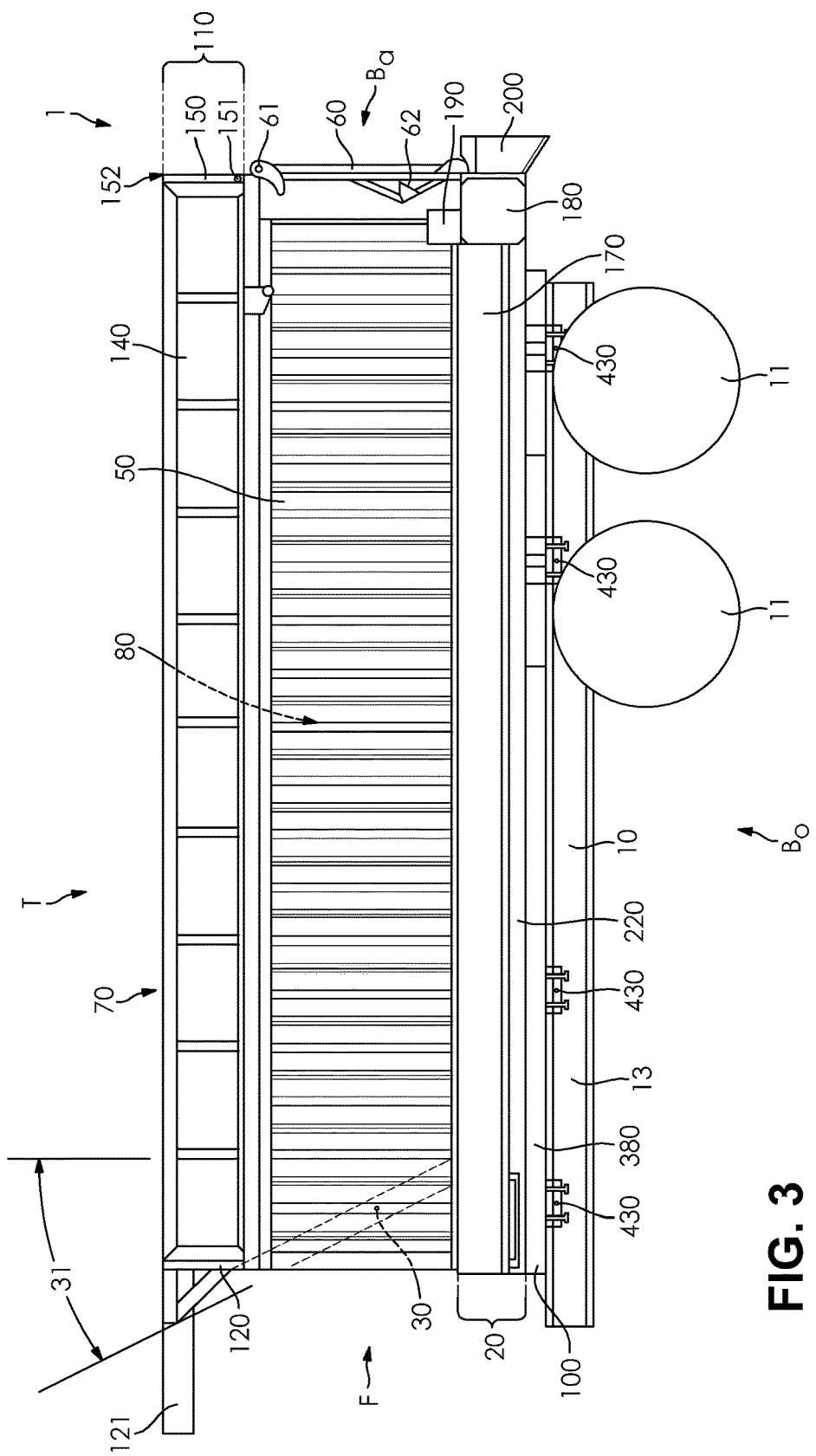
FIG. 3 is left side view of the belt-discharge body shown in FIG. 1.

The aluminum belt-discharge bodies will be discussed in more detail with reference to the accompanying figures. With reference to FIGS. 1-3, a belt-discharge body 1 according to an embodiment of the invention is shown. FIG. 1 is a view taken from a perspective above and in front F of a left side L of a belt-discharge body 1. FIG. 2 is a rear view of the belt-discharge body shown in FIG. 1. FIG. 3 is left side view of the belt-discharge body shown in FIG. 1.

In FIGS. 1-3, the belt-discharge body 1 is shown mounted onto a frame 10 that is supported by wheels 11. The belt-discharge body 1 is configured to be mounted to a steel frame 10, which can be the frame of a straight truck or trailer chassis, both of which are conventional. The steel frame 10 of a truck or trailer chassis will be referred to herein as "truck frame 10."

Truck frame 10 includes two longitudinal steel beams—right beam 12, and left beam 13—that extend longitudinally between the front F and back $B_a$ of the truck frame 10 and substantially parallel to one another, and can include one or more transverse cross members (not shown) extending perpendicular between the beams 12, 13 and spacing the beams 12, 13 from each other. The right beam 12 is on the right R, and the left beam 13 is on the left L of the truck frame 10, and the beams 12, 13 are spaced from each other along their length to define a width $W_T$ of the truck frame 10. It will be understood that the truck frame 10 and wheels 11 are not necessarily considered to be part of the invention.

FIGS. 1-3 show that the belt-discharge body 1 has a base 20, four walls—a front wall 30, a right side wall 40, a left side wall 50, and a gate 60—extending up from the base 20, and an open top 70 through which hot-mix asphalt or other material can be deposited into the interior 80. The four walls 30, 40, 50, 60 and the base 20 thus define an open-top reservoir. It will be appreciated that the open top 70 can be closed using conventional covering equipment (e.g., a tarp) to retain heat and/or prevent material escape during hauling, as is known in the art. As used herein, the term "inside", "interior", or "inner" refers to a direction or location towards the interior 80 of the body 1, and the term "outside" or "outer" refers to a direction or location away from the interior 80.

The base 20 can include a right eave 160 and a left eave 170 extending out from the base, respectively on the right R and left L sides of the base 20; and motor housings 180 for housing one or more drive motor assemblies (including a drive motor and sprockets/wheels) to drive the conveyor belt. The base 20 also includes a discharge chute 200 for directing the material being discharged from the interior 80 of the body 1 to a target location, e.g. to the loading chute of a paving machine. The base 20 also includes two light housings 190 mounted on top of the two motor housings 180, and that house lights 191, e.g. brake lights, reverse lights, turn-indicating lights, and nighttime running lights. The position of the light housings 190 on top of the motor housings 180 and away from the discharge chute 200, thereby inhibits the lights 191 from being dirtied by the discharged material.

The front wall 30, right side wall 40, and left side wall 50 are sloped. The front wall 30 is sloped from vertical at a front wall angle 31 (FIG. 3). The front wall angle 31 can range from about 10-25 degrees (°) from vertical. The front wall angle 31 can be for example, about 23.63°, 21.63°, 19.14°, or 10.18° from vertical. As will be appreciated, the closer the front wall angle 31 is to vertical, the further the center of mass of the material being hauled is to the front F of the body 1, and therefore more weight is shifted to the front of the body 1 and onto a front truck axle. More weight moved forward on the front truck axle is advantageous because it provides more control to a truck operator during driving of the truck and allows for the weight of the load to be properly distribution from the rear axles toward the front axles.

The two side walls 40, 50 are sloped to define a side wall angle 41 (FIG. 2) with respect to each other. The side wall angle 41 can range from about 55-60°, and in one embodiment the side wall angle 41 is about 58°, wherein each side wall 40, 50 is sloped about 29° from vertical.

Figure 7:
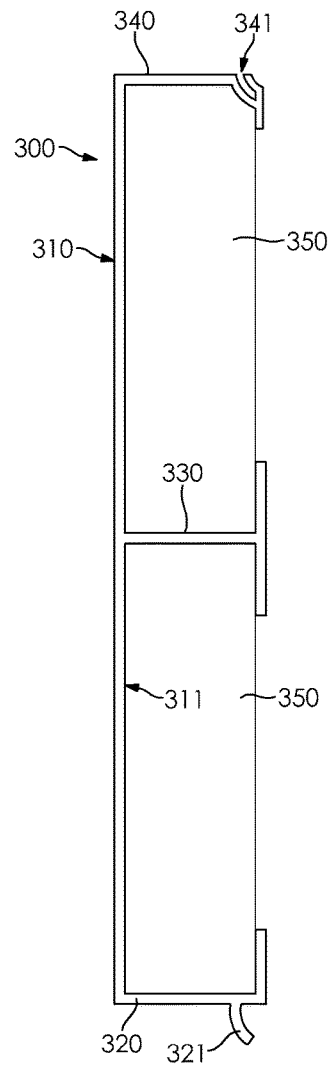
FIG. 7 is a cross-section view of an aluminum panel used to form the side walls of the belt-discharge body shown in FIG. 1.
Figure 8:
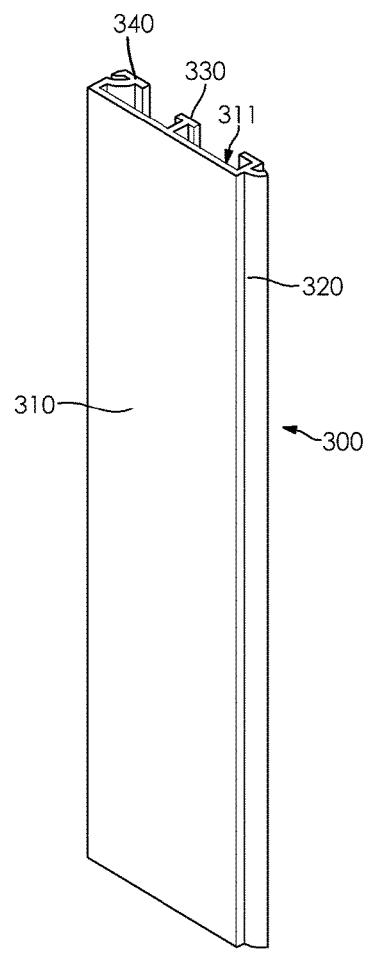
FIG. 8 is a perspective view of an aluminum panel used to form the side walls of the body.
Figure 9:
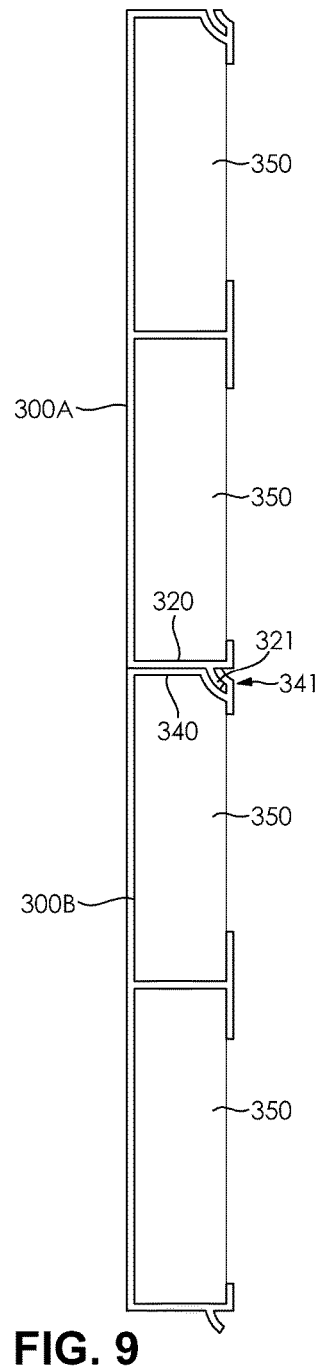
FIG. 9 is a cross-section view of two interlocking aluminum panels used to form the side walls of the belt-discharge body shown in FIG. 1 and their orientation and arrangement relative to each other.

With additional reference to FIGS. 7-9, each of the right 40 and left 50 side walls is formed by a plurality of interconnecting aluminum panels 300 that may be identical, formed by extrusion, and have a cross-sectional shape as best seen in FIG. 7.

Each panel 300 has a main body 310 and three ribs 320, 330, 340 that run along a length of the main body 310 and extend perpendicular to the main body 310 from an inside surface 311 of the main body 310. A first rib 320 has a substantially L-shaped cross-section and includes a projection 321. A second rib 330 has a substantially T-shaped cross-section. A third rib 340 has a substantially L-shaped cross-section and includes a channel 341.

The channel 341 on the third rib 340 has a shape corresponding to a shape of the projection 321 on the first rib 320, such that the projection 321 on one panel can fit inside the channel 341 on a second panel so that the first and second panels can interlock with each other. This is best seen in FIG. 9, wherein a first panel 300A is mated and interlocking with a second panel 300B. As shown, the projection 321 on the first rib 320 of the first panel 300A is fitted into the channel 341 on the third rib 340 of the second panel 300B to thereby interlock the first 300A and second 300B panels together. As will be appreciated, additional panels can be attached to either of the first 300A and second 300B panels in a similar manner in order to assemble the right 40 and left 50 side walls. The aluminum panels 300, because they are extruded, provide increased strength compared to, for example, panels formed from similarly gauged sheet aluminum.

The extruded panels 300 may be positioned such that the inside surface 311 faces the interior 80 of the body 1, or the panels 300 can face the opposite direction. In one embodiment, the interior surface 311 of the panels 300 face the interior 80 of the body 1. In this embodiment, the walls 40, 50 may include thermal insulation 350 positioned at the inside surface 311 and between each of the ribs 320, 330, 340 as shown in FIG. 7 for keeping hot-mix asphalt warm during transport. The body 1 can further include an inner skin 360 (see FIG. 4) attached to the inside of the panels 300 that presents a substantially flat and smooth surface facing the interior 80 and against which hauled material (e.g. asphalt) rests. Inner skin 360 may comprise stainless steel sheets that are attached to the ribs 320, 330, 340 of the panels 300, for example by stainless steel self-tapping 5/16" roof bolts.

The interlocking extrusion panels 300 are both lighter and stronger than conventional steel panels used for the same purpose in typical live-bottom trucks. In several embodiments, the panels 300 are about twelve inches wide (measured from the first rib 320 to the third rib 340) and about two inches thick (measured from the main body 310 to the distal end of the ribs 320, 330, 340).

The gate 60 of the body 1 is movable about a hinge 61, between an open position (not shown) for allowing discharge of the payload from the interior 80, and a closed position (FIGS. 1-3) for preventing discharge of the payload from the interior 80. The gate 60 can be secured in the closed position by a locking mechanism 62. As will be appreciated, the gate 60 can selectively rotate about the hinge 61 to an open position for discharging hauled material, wherein the bottom 63 of the gate 60 moves towards the top T of the body 1. When in a closed secured position as shown in FIGS. 1-3, the gate 60 can be positioned at an angle of about 0° relative to vertical.

In several embodiments, the hinge 61 comprises an aluminum bar having a square/rectangular cross-section. The square aluminum stock piece fits into a square/rectangular socket in the gate 60 and is secured thereto. During rotation of the gate 60, the fit between the square/rectangular hinge 61 and the square/rectangular socket in the gate 60 key together and offers maximum support between the gate 60 and hinge 61. The hinge 60 can have right and left ends that have a round cross-section. The rounded ends allow the gate 60 to easily rotate, for example in round brackets.

The belt-discharge body 1 can optionally include an uppermost aluminum bin extension 110 that increases the volume of the interior 80 by increasing the height of the body 1, and therefore allows the body 1 to contain a greater volume of payload. The bin extension 110 can be secured to, and aligned with the top of the sloped walls of the body 1 using a bracket 111 (see FIG. 5) or by welding to the walls. The bin extension 110 includes a front wall extension 120, a right side wall extension 130, a left side wall extension 140, and a back wall extension 150. As shown, the wall extensions 110, 120, 130, and 140 extend vertically up from the top edge of the sloped walls 30, 40, 50 and the gate 60.

The front wall extension 120 can include an aluminum tarp shelf 121 including a tarp for covering the open top 70 of the body 1. The tarp shelf 121 can extend over a portion, or all of a cab of an associated truck to which the truck frame 10 is attached. The back wall extension 150 can include a hinge 151 (FIG. 2) that allows the back wall extension 150 to rotate between a close position (FIGS. 1-3) and an open position (not shown), wherein a top 152 of the back wall extension 150 moves toward the bottom $B_o$ of the body 1. As will be appreciated, when in an open position, the hinged back wall extension 150 will allow a loading chute from a machine (e.g. a milling machine) to extend into the interior 80 of the body 1 without damaging the back wall extension 150 as might occur if the back wall extension 150 were not hinged.

Figure 4:
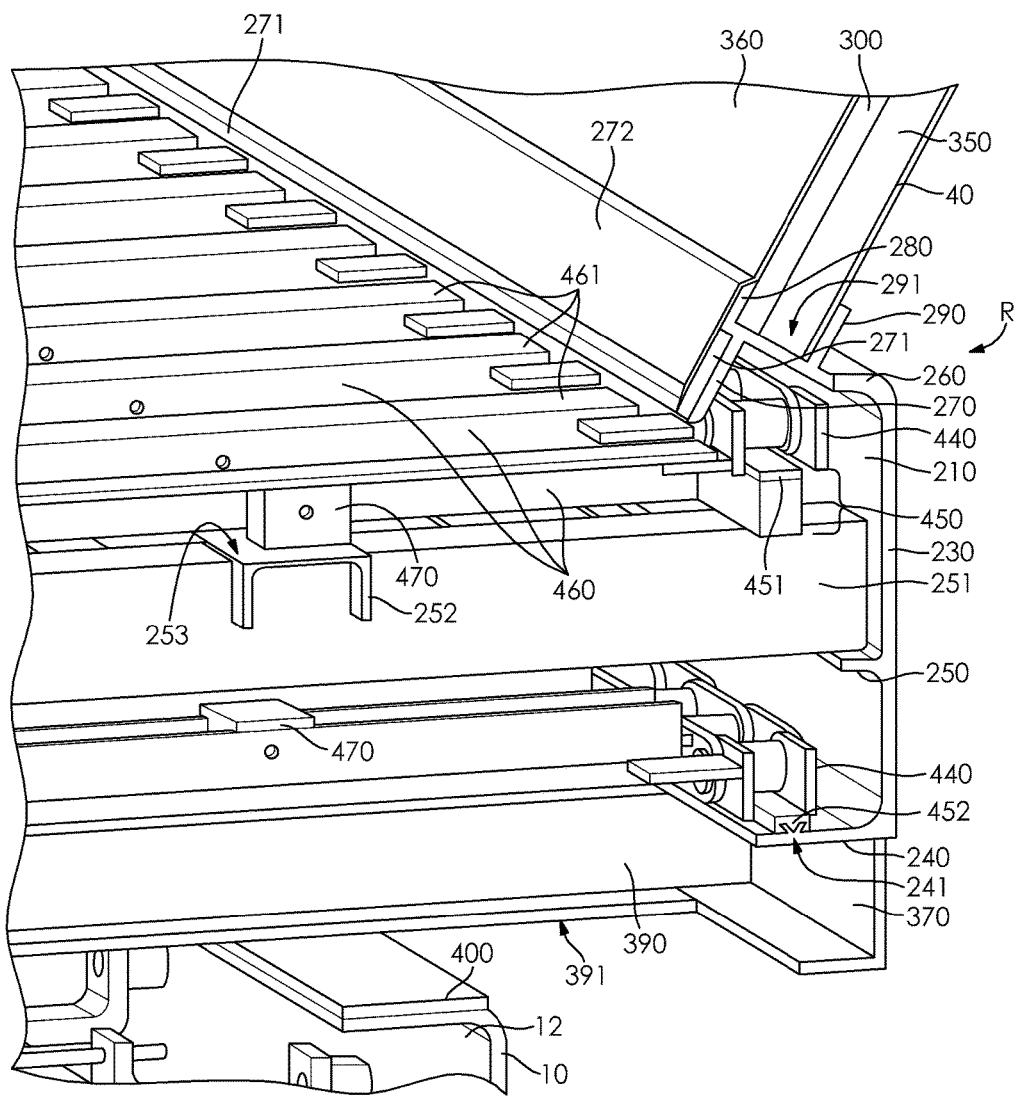
FIG. 4 is a perspective cut away view of the belt-discharge body shown in FIG. 1.
Figures 5, 6:
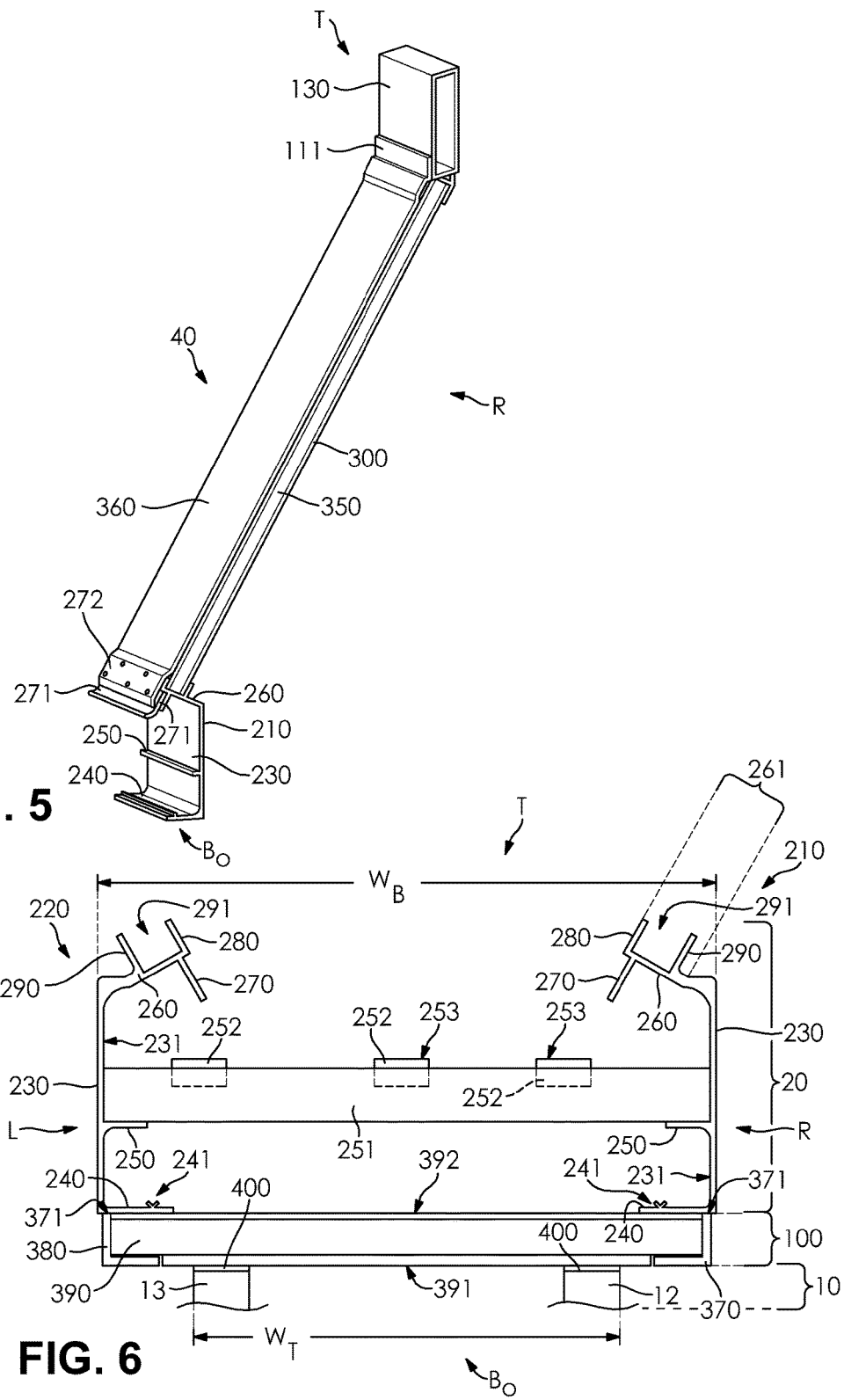
FIG. 5 is perspective cut away view of a portion of the belt-discharge body shown in FIG. 1.
FIG. 6 cross-section view of a portion of the belt-discharge body shown in FIG. 1.

With additional reference to FIGS. 4-6, the base 20 includes right 210 and left 220 longitudinal aluminum frame members, each extending longitudinally between a front F and back $B_a$ of the base 20, a plurality of aluminum cross members 251 extending laterally between the frame members 210, 220, and a plurality of aluminum longitudinal supports 252 extending longitudinally between the plurality of cross members 251.

FIG. 4 shows a cut away view of a portion of the body 1 mounted on a truck frame 10, and shows a portion of the right side wall 40, and a portion of the base 20 including a portion of a belt conveyor system. In FIG. 4, a conveyor belt of the belt conveyor system is not shown so that other details of the base 20 can been more clearly shown. Although only the right portion of the body 1 is shown, it will be understood that the left side portion of the body 1 is a mirror image of the right side, and therefore has identical parts and functioning unless otherwise noted.

FIG. 5 shows another cut away view of a portion of the body 1. In FIG. 5, only the right frame member 210, right side wall 40, and right side wall extension 130 are shown so that the details of these elements can be more clearly shown. However, it will be understood that the left frame member 220, left side wall 50, and left side wall extension 140 have similar features as the right side.

FIG. 6 shows a cross-section of the base 20, subframe 100, and truck frame 10. In FIG. 6, the conveyor belt and side walls 40 and 50 are not shown so that other elements of the base 20 can be shown more clearly. Although only one cross member 251 can be seen in the FIGS. 4 and 6, it will be understood that the base 20 includes multiple cross members positioned along the length of the base 20. The cross members 251 may be secured to the frame members 210, 220 for example, by welding, and used in conjunction with the supports 252 to secure the right and left frame members 210, 220 to be parallel to each other.

The longitudinal frame members 210, 220 of the base 20 may be identical, and may be produced by an aluminum extrusion process to form a one-piece aluminum longitudinal frame member having a cross-sectional shape as seen in FIGS. 4-6. Further, the aluminum cross members 251 and longitudinal supports 252 may also be formed by extrusion. As shown, the longitudinal frame members 210, 220 each include a main vertical wall 230, and three shelves—a bottom shelf 240, a middle shelf 250, and a top shelf 260—extending horizontally from the inside surface 231 of the main vertical wall 230, and along a length of frame members 210, 220 from the front F to the back $B_a$. As seen in FIG. 6, the three shelves 240, 250, 260 on the right longitudinal frame member 210 face inward towards the three shelves 240, 250, 260 on the left longitudinal frame member 220.

The bottom shelf 240 includes a V-shaped rib 241 extending longitudinally along its length for securing a bottom wear plate 452 (FIG. 4). The middle shelf 250 is for supporting an end of each cross member 251. The top shelf 260 includes an angled portion 261 including three steps—an inside step 270 and two outside steps 280, 290. The inside step 270 supports a flange 271 (FIGS. 4-5), and the two outside steps 280, 290 define a groove 291 between them for aligning and supporting components of the right 40 and left 50 side walls with respect to the base 20, as best shown in FIG. 5. That is, the groove 291 in the top shelf 260 of the longitudinal frame members 210, 220 is sized to accept the thickness of the interlocking extrusion panels 300, and therefore the groove 291 has a width measured between the two outside steps 280, 290 of just greater than about two inches (e.g. 2.1 inches). As will be understood, the angle of the angled portion 261 thus determines the slope of the right 40 and left 50 side walls.

The base 20 includes a belt conveyor system mounted between the frame members 210, 220 and is configured to convey material contained in the body 1 toward the back $B_a$ and out the interior 80 when the gate 60 is opened. The belt conveyor system includes a continuous conveyor belt (not shown), flight bars 460, two continuous chains 440, wheels/sprockets, and a drive motor assembly including a drive motor.

Conventional truck and trailer frames typically consist of right and left beams that are spaced approximately 34 inches apart (outer dimension). Conventional live-bottom trucks made of steel therefore utilize conveyor belts about 30" wide in order to match this 34 inch dimension. In contrast, the conveyor belt used in the aluminum belt-discharge body 1 according to the invention is wider than belts conventionally used in narrower live-bottom trucks and is preferably about 42" in width. The conveyor belt is centered below the right 40 and left 50 side walls, the bottoms of which are spaced apart about 40". Therefore, the belt extends under the bottom of the side walls 40, 50 by a certain amount.

In one embodiment, the bottom edge of each of the front wall 30, the right side wall 40, and the left side wall 50 terminate about 3.48" above the conveyor belt, and the gate 60 terminates about 0.74" above the conveyor belt. To bridge this gap, a rubber flange 271 is secured to the inside step 270 of the angled portion 261 of the top shelf 260 of the base 20, and is covered by a stainless steel flange cover 272. The flange 271 extends down towards the belt to create a "seal" with the conveyor belt, and thereby inhibits the hauled material from escaping from the interior 80 of the body 1 along the right or left side of the belt, yet provides enough clearance from the belt to allow the belt to freely revolve around the plurality of cross members 251. The front wall 30 may have a similar rubber flange.

The conveyor belt is mounted on the flight bars 460. Each flight bar 460 is mounted at either end to one of two continuous chains 440. The two chains 440 are each mounted at the front F and a back $B_a$ of the base 20 around a wheel/sprocket. At least one of the wheels/sprockets is turned by a drive motor assembly (including a drive motor) housed the motor housing 180. The continuous belt is configured to propagate around the plurality of cross members 251.

The belt conveyor system includes two continuous chains, wherein the right chain 440 is shown in FIG. 4. As the chains 440 are moved by the motor assembly, the chains 440 are a guided in a circular path by a top chain guide 450 comprising a top wear plate 451 arranged on top of the plurality of cross members 251, and a bottom chain guide comprising a bottom wear plate 452 secured to the V-shaped rib 241 on the bottom shelf 240 of the frame members 210, 220. The chains rotate at the front F and back $B_a$ around a wheels/sprockets, wherein at least one wheel/sprocket is driven by one or more motors housed in the motor housing 180 at the back $B_a$ of the body 1.

Extending between, and connecting the two chains are a plurality of aluminum flight bars 460. Each end of the flight bars 460 are attached to a link in the chains. The flight bars 460 may be extruded, and are connected to a continuous conveyor belt (not shown). When secured relative to the flight bars 460, the conveyor belt will contact a face 461 of the flight bars 460 and will rotate when the flight bars 460 are rotated by the chains 440, which are moved by the motor in the motor housing 180. Thus, the flight bars 460 are used support the conveyor belt.

Flight bars made of aluminum are not as strong as flight bars of the same dimensions made of steel. Thus, to obtain flight bars of sufficient strength, the flight bars 460 used in the aluminum belt-discharge bodies 1 according to the invention are larger by comparison to conventional steel flight bars. The use of larger flight bars 460 necessitated the use of a chain sprocket in the motor housing 180 that has a larger diameter than is conventionally used.

Conventional steel live-bottom trucks only utilize two additional supports under the flight bars. However, since the flight bars 460 are made of aluminum, in several embodiments at least three longitudinal supports 252 are used for supporting the flight bars 460. The flight bars 460 include polymeric (e.g. nylon) pucks 470, which glide along an upper surface 253 of the longitudinal supports 252. Therefore, it will be appreciated that the number and the position of the pucks 470 included on each flight bar 460 corresponds to the number and position of longitudinal supports 252 in the base 20. In several embodiments, the upper surfaces 253 of the longitudinal supports 252 are elevated just above the upper surfaces of the plurality of cross members 251 as shown.

As shown in FIGS. 1 and 6, the base 20 has a width $W_B$ defined by the distance between the outer surfaces or outside edges of the right 210 and left 220 frame members. As shown, the width $W_B$ of the base 20 is more than the width $W_T$ of the truck frame 10 defined by the distance between the outer surfaces of the right 12 and left 13 beams. Such difference between $W_B$ and $W_T$ can cause problems when mounting the body 1 to the truck frame 10. To address these problems, the belt-discharge body 1 includes an aluminum subframe 100 positioned between the truck frame 10 and the base 20, and which accounts for the difference between $W_B$ and $W_T$.

The subframe 100 is mounted directly to the longitudinal frame members 210, 220 and mounted on the truck frame 10. The subframe 100 includes right 370 and left 380 aluminum longitudinal rails that extend longitudinally from the front F to the back $B_a$ of the subframe 100. The rails 370, 380 may be extruded and can have a generally L-shaped cross-section as shown. The subframe 100 also includes a plurality of lateral members 390, which may be extruded, having a generally H-shaped cross-section (e.g. I-beam), and extending transversely between, and secured to the rails 370, 380.

As best seen in FIGS. 4 and 6, the bottom surface 391 of the lateral members 390 sits on the top surfaces of the beams 12, 13 of the truck frame 10, while the bottom shelf 240 of each of the longitudinal frame members 210, 220 sits on the top surface 392 of the lateral members 390 and against the top edge 371 of the rails 370, 380. A polymeric (e.g., Nylon) barrier material 400 may be positioned between the steel beams 12, 13 of the truck frame 10 and the aluminum lateral members 390 to inhibit galvanic reaction between them. In one embodiment, the barrier material 400 is about 0.5" thick (measured from top T to bottom $B_o$) and about 2" wide (measured from left L to right R), and runs the length of the beams 12, 13 of the truck frame 10, and located on top of each beam 12, 13.

Figure 10:
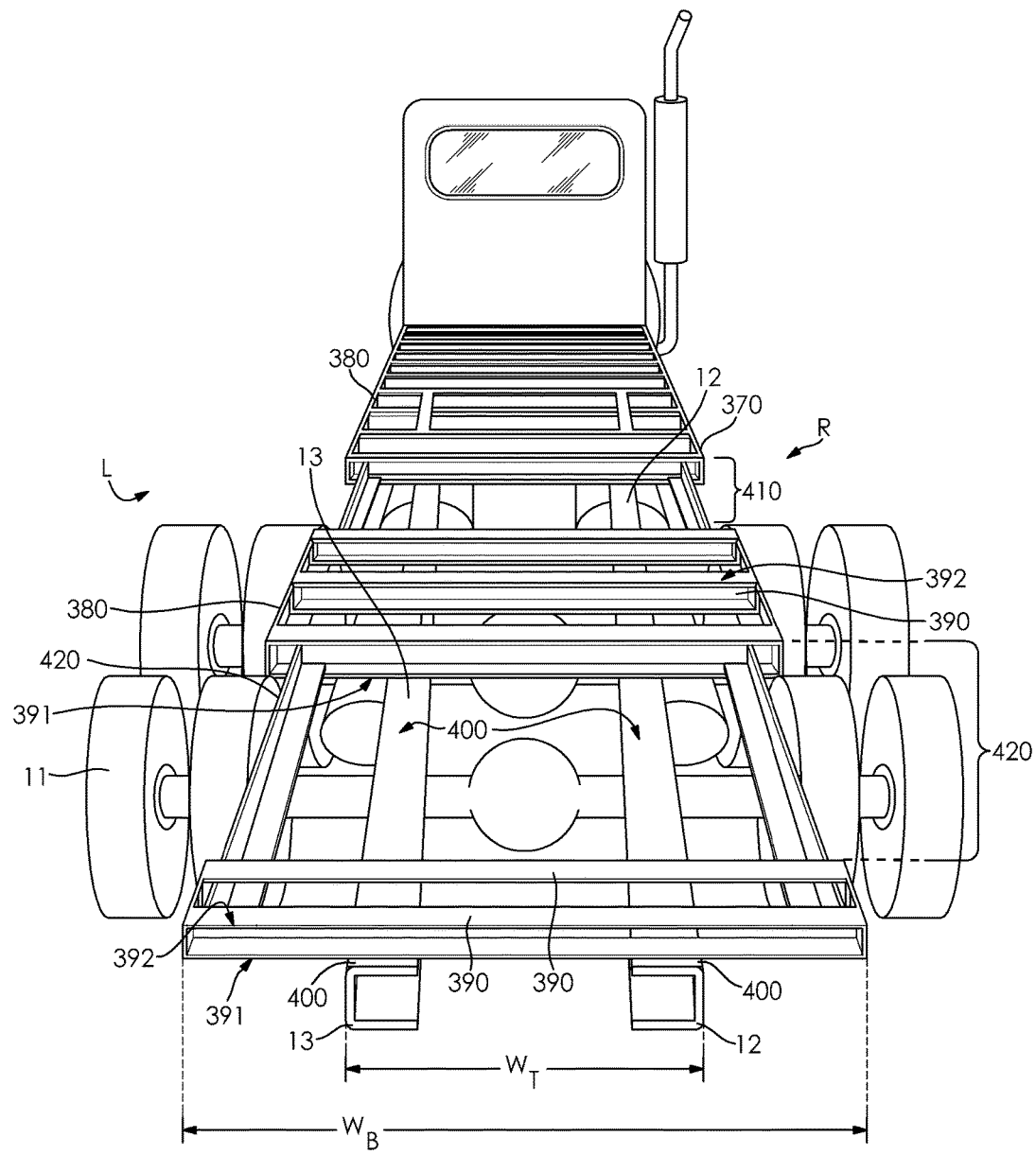
FIG. 10 is a perspective view taken from above and to the front of a subframe portion of the belt-discharge body shown in FIG. 1 being mounted to a truck chassis.
Figure 11:
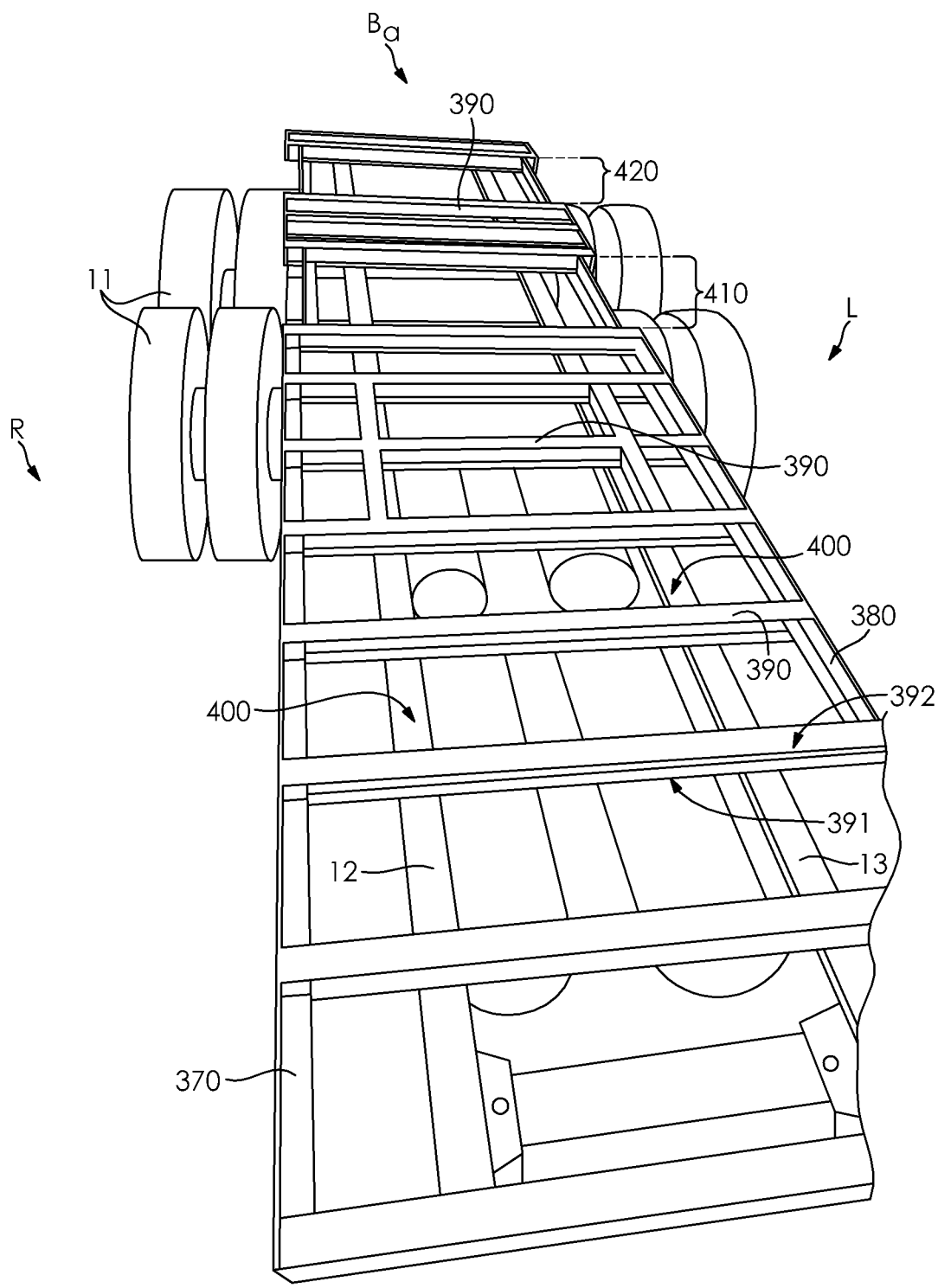
FIG. 11 is a perspective view taken from above and to the back of a subframe portion of the belt-discharge body shown in FIG. 1 being mounted to a truck chassis.

With additional reference to FIGS. 10 and 11, which show only the subframe 100 mounted on a truck chassis, the right R and left L sides of the subframe 100 each include two portions 410, 420 that have a reduced width as compared to the remainder of the subframe 100. The positions of the two portions 410, 420 are associated with the position of the wheels 11 of the truck frame 10, and the two portions 410, 420 have a reduced width so that the subframe 100 does not interfere with the movement (e.g. rotation and up and down movement) of the wheels 11, yet the remainder of the subframe has a width (measured between the outside surfaces of the rails 370, 380) that closely matches the width of the base 20. This can be seen in FIG. 6, wherein the subframe 100 has a similar width as the base 20.

The subframe 100 may be connected to the base 20 by welding or other means. The subframe 100 may be connected to the truck frame 10 by a plurality of brackets 430, comprising an aluminum top portion connected (e.g. by welding or bolts) to the aluminum subframe 100, a steel bottom portion connected (e.g. by welding or bolts) to the steel truck frame 10, bolts extending through the bottom and top portions, and nuts threaded onto the bolts to secure the top and bottom portions together.

A nylon barrier may be positioned between the top and bottom portions of the brackets 430 in order to prevent galvanic reaction between the aluminum top portion and the steel bottom portion of the bracket 430. One or more of the brackets 430 can include springs wound around the shaft of the bolt and compressed between the bracket and the head of the bolt or the nut. The inclusion of the spring in the bracket allows some limited movement of the subframe 100 relative to the truck frame 10 that is commensurate with the K constant of the spring. Thus, spring loaded bracket may be used to accommodate off-road travel and torque movement between the subframe 100 and truck frame 10, which could otherwise result in fatigue cracking of the brackets 430. A spring assisted grade 8 bolt system may be used, for example.

In operation, the rate of material discharged from the belt-discharge body 1 is a function of belt speed and the degree to which the gate 60 is opened. In a situation where the belt-discharge body 1 is incorporated into a truck, and the truck is loaded with material and arrives at a worksite, the operator of the truck may unlock the gate 60 using an electric over hydraulic switch located in the cab of the truck. Regardless of how much material is needed to be discharged, the operator may fully open the back gate using another electric over hydraulic switch, which is also located in the cab. Once the operator is signaled to discharge the material, the operator turns the belt drive motor on to move the belt by using another electric over hydraulic switch located in the cab.

In an alternative embodiment, the operator can unlock the gate 60, open the gate 60, and activate the belt using a series of three hydraulic levers located outside the cab and on the left side L of the body 1. Thus, these functions can be performed from the exterior of the cab. If desired, both embodiments can be provided in a single truck including the belt-discharge body 1.

In several embodiments, the belt-discharge body 1 has a hydraulic gate mechanism as opposed to a pneumatic gate system. This feature eliminates or reduces the potential for accidental opening or release of the gate, the risk of which is a safety issue, since hot-mix asphalt is hauled at a temperature of about 300° F. Pneumatic gates require constant air pressure to keep them operational, making them susceptible to malfunction and popping open if the truck loses the ability to produce air. One of the problems with the use of air systems is when paving materials are hauled on trucks that are to be transported on ferries (e.g., to islands). U.S. Coast Guard regulations require that truck engines be shut off when the ferry is moving over the water. This can cause a problem with air systems because air pressure may be lost when the truck engine is turned off. In contrast, hydraulic gate systems are more secure and less prone to failure since they do not require a running engine to maintain hydraulic pressure in the system. This not only addresses the safety issues present in pneumatic systems, but also eliminates the need for the addition of an air supply system to the belt-discharge body.

The dimensions shown in the accompanying drawing figures are not necessarily shown to scale. It will be appreciated that belt-discharge bodies 1 according to the invention can be made to accommodate various sizes of truck frames 10 (e.g., lengths between 15' and 24' for truck-mounted bodies, and lengths as great as 28-30' or greater for trailer mounted bodies).

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A belt-discharge body configured to be mounted to a frame of a straight truck or trailer chassis, comprising an open-top reservoir defined by a base and a plurality of walls extending up from the base, and an aluminum subframe attached to a bottom of the base, wherein the walls include a sloped front wall, a back wall, a sloped right side wall, and a sloped left side wall, wherein the base includes:

two one-piece extruded aluminum longitudinal frame members, each of the frame members including a main vertical wall and three shelves extending horizontally from an inside surface of the main vertical wall, the three shelves including a bottom shelf, a top shelf, and a middle shelf located between the bottom shelf and the top shelf, the top shelf including a groove, a portion of each of the side walls is fitted inside the groove of one of the frame members to thereby align the side walls with respect to the base, a plurality of aluminum cross members, each supported on the middle shelves of the frame members and extending laterally between the frame members and securing the frame members relative to each other, a plurality of aluminum supports located between the frame members and extending longitudinally between, and secured to the cross members, and a belt conveyor system mounted between the frame members and including a continuous belt, and wherein the back wall defines a gate configured to open so that associated material contained inside the reservoir can be discharged through the gate by the belt conveyor system.

2. The belt-discharge body according to claim 1, wherein: the top shelf includes an inside step and two outside steps, the inside step supports a flange that extends down towards the continuous belt, and the outside steps are spaced from one another to thereby define the groove.

3. The belt-discharge body according to claim 1, wherein the bottom shelf includes a rib extending longitudinally along a length of the bottom shelf.

4. The belt-discharge body according to claim 1, wherein the aluminum subframe includes two longitudinal rails and a plurality of lateral members extending between the rails and securing the rails relative to each other.

5. The belt-discharge body according to claim 4, wherein the rails of the subframe each contact one of the frame members of the base.

6. The belt-discharge body according to claim 5, wherein the rails of the subframe each have a substantially L-shaped cross-section, and the lateral members each have an H-shaped cross-section.

7. The belt-discharge body according to claim 6, wherein the frame members each contact a top edge of one of the rails of the subframe, and contact a top surface of each of the lateral members.

8. The belt-discharge body according to claim 4, wherein the subframe includes two portions that each have a reduced width as compared to a remainder of the subframe.

9. The belt-discharge body according to claim 1, wherein: the right and left side walls are each formed by a plurality of interconnecting extruded aluminum panels, each of the panels includes a main body and three ribs extending perpendicular from an inside surface of the main body, the ribs comprise a first rib, a second rib, and a third rib, the second rib having a substantial T-shaped cross-section and the first and third rib having a substantial L-shaped cross section, the first rib including a projection and the third rib including a channel, the panels are interconnected such that the projection of each of the panels is fitted inside the channel of an adjacent panel.

10. The belt-discharge body according to claim 9, wherein the each of the panels includes insulation at the inside surface and between the three ribs.

11. The belt-discharge body according to claim 10, wherein:

the three ribs of each of the panels faces towards an inside of the reservoir, and the belt-discharge body further includes a stainless steel inner skin attached to the panels that presents a flat and smooth interior surface of the reservoir.

12. The belt-discharge body according to claim 1, further comprising a bin extension including a vertical front wall extension including a tarp shelf, a vertical right side wall extension, a vertical left side wall extension, and a hinged vertical back wall extension.

13. A live-bottom truck comprising a truck frame, wheels attached to the truck frame, and a belt-discharge body mounted on top of the truck frame, wherein:

the truck frame includes two steel beams extending longitudinally between a front and a back of the truck, the truck frame having a width defined by the distance between outside surfaces of the beams, the belt-discharge body includes an open-top reservoir and an aluminum subframe positioned between the open-top reservoir and the truck frame, the open-top reservoir includes a base and four walls extending up from the base, the walls comprising a sloped front wall, a sloped right side wall, a sloped left side wall, and a back gate, the base includes a one-piece aluminum right longitudinal frame member and a one-piece aluminum left longitudinal frame member, each of the frame members including a main vertical wall and three shelves extending horizontally from an inside surface of the main vertical wall, the shelves including a bottom shelf, a top shelf including a groove, and a middle shelf located between the bottom shelf and the top shelf, a plurality of aluminum cross members each supported at either end on the middle shelf of the respective right and left frame members, and each extending laterally between the frame members and securing the frame members relative to each other, at least three aluminum supports located between the frame members and extending longitudinally between, and secured to the cross members, and a belt conveyor system mounted between the frame members and including a continuous belt and two continuous chains, and the subframe includes two longitudinal rails and a plurality of lateral members extending between the rails and securing the rails relative to each other, a width of the base, which is defined by the distance between the outside edges of the frame members, is greater than the width of the truck frame, and the lateral members of the subframe rest upon the beams of the truck frame.

14. The live-bottom truck according to claim 13, wherein a portion of the right side wall is fitted inside the groove of the top shelf of the right frame member and a portion of the left side wall is fitted inside the groove of the top shelf of the left frame member to thereby align the side walls with respect to the base.

15. The live-bottom truck according to claim 13, wherein: the top shelf includes an inside step and two outside steps, the inside step supports a flange that extends down towards the continuous belt, and the outside steps are spaced from one another to thereby define the groove.

16. The live-bottom truck according to claim 13, wherein the bottom shelf includes a rib extending longitudinally along a length of the bottom shelf, the rib securing a wear plate against which a portion of one of the chains rests.

17. The live-bottom truck according to claim 13, wherein the rails of the subframe each contact one of the frame members of the base.

18. The live-bottom truck according to claim 13, further comprising a barrier material positioned between the beams of the truck frame and the subframe.

19. The live-bottom truck according to claim 13, wherein:
the right and left side walls are each formed by a plurality of interconnecting aluminum panels,
each of the panels includes a main body and three ribs extending perpendicular from an inside surface of the main body,
the ribs comprise a first rib, a second rib, and a third rib, the second rib having a substantial T-shaped cross-section and the first and third rib having a substantial L-shaped cross section,
the first rib includes a projection and the third rib includes a channel,
the panels are interconnected such that the projection of each of the panels is fitted inside the channel of an adjacent panel,
the three ribs of each of the panels faces towards an inside of the reservoir, and
the belt-discharge body further includes a stainless steel inner skin attached to the panels that presents a flat and smooth interior surface of the reservoir.

20. The live-bottom truck according to claim 19, wherein each of the panels includes thermal insulation between the inside surface, the inner skin, and the three ribs.

* * * * *